United States Patent
Munoz et al.

(10) Patent No.: US 12,203,433 B2
(45) Date of Patent: Jan. 21, 2025

(54) FUEL PUMP DEVICES, SYSTEMS, AND METHODS

(71) Applicant: Cummins Inc., Columbus, IN (US)

(72) Inventors: Roberto M. Munoz, Columbus, IN (US); Amanda Baker, Columbus, IN (US); Yip Kwok, Indianapolis, IN (US); Thomas M. Yeager, Columbus, IN (US)

(73) Assignee: Cummins Inc., Columbus, IN (US)

( * ) Notice: Subject to any disclaimer, the term of this patent is extended or adjusted under 35 U.S.C. 154(b) by 43 days.

(21) Appl. No.: 18/181,113

(22) Filed: Mar. 9, 2023

(65) Prior Publication Data

US 2023/0213012 A1 Jul. 6, 2023

Related U.S. Application Data

(63) Continuation of application No. PCT/US2021/049057, filed on Sep. 3, 2021.
(Continued)

(51) Int. Cl.
*F02M 59/10* (2006.01)
*F02M 59/44* (2006.01)

(52) U.S. Cl.
CPC .......... *F02M 59/102* (2013.01); *F02M 59/44* (2013.01); *F02M 2200/85* (2013.01)

(58) Field of Classification Search
CPC .. F02M 59/102; F02M 59/44; F02M 2200/85; F16D 1/076; F04B 53/16;
(Continued)

(56) References Cited

U.S. PATENT DOCUMENTS 5,839,414 A * 11/1998 Klinger ................ F02M 59/462
   417/454
5,983,863 A * 11/1999 Cavanagh .............. F02M 51/00
   123/456
(Continued)

FOREIGN PATENT DOCUMENTS

GB          2588752      5/2021
WO       2013098300     7/2013
(Continued)

*Primary Examiner* — Sizo B Vilakazi
(74) *Attorney, Agent, or Firm* — Taft, Stettinius & Hollister LLP

(57) ABSTRACT

Disclosed herein are devices, systems, and methods relating to high-pressure fuel pump designs and features. A high-pressure fuel pump assembly includes a body, a camshaft, and an embossment. The body has a forward end and a rearward end opposite thereof and configured to couple to a low-pressure fuel pump. The camshaft is received and secured within a central bore of the body so as to be rotationally movable within the central bore. A coupler end of the camshaft is configured to couple to a drive shaft of the low-pressure fuel pump. The embossment includes at least one fastener boss configured to receive a fastener to couple the low-pressure fuel pump to the high-pressure fuel pump assembly. The embossment is formed at the rearward end of the body such that thermal stresses that cause geometrical deformations at the embossment are reduced through a range of engine temperature operating conditions.

20 Claims, 5 Drawing Sheets

Related U.S. Application Data

(60) Provisional application No. 63/076,753, filed on Sep. 10, 2020.

(58) Field of Classification Search
CPC .......... F04B 13/02; F04B 23/10; F04B 53/08; F04B 53/22
See application file for complete search history.

(56) References Cited

U.S. PATENT DOCUMENTS

| | | | |
|---|---|---|---|
| 6,095,774 A * | 8/2000 | Tanaka | F02M 63/0225 |
| | | | 417/540 |
| 7,540,274 B2 * | 6/2009 | Yamada | F02M 59/442 |
| | | | 123/496 |
| 7,647,918 B2 | 1/2010 | Portner et al. | |
| 8,967,037 B2 | 3/2015 | Jones et al. | |
| 2004/0045537 A1 | 3/2004 | Simon et al. | |
| 2013/0192563 A1 | 8/2013 | Oki | |
| 2015/0275892 A1 * | 10/2015 | Shaull | F02M 37/0023 |
| | | | 417/559 |
| 2019/0112959 A1 * | 4/2019 | Xi | F04B 23/06 |
| 2019/0249589 A1 * | 8/2019 | Ernst | F25B 27/02 |

FOREIGN PATENT DOCUMENTS

| | | |
|---|---|---|
| WO | 2017039634 | 3/2017 |
| WO | 2017134332 | 8/2017 |
| WO | 2021081273 | 4/2021 |

* cited by examiner

FUEL PUMP DEVICES, SYSTEMS, AND METHODS

CROSS-REFERENCE TO RELATED APPLICATIONS

The present application is a continuation of PCT Patent Application No. PCT/US2021/049057, file Sep. 3, 2021 which claims priority to U.S. Provisional Patent Application Ser. No. 63/076,753, filed on Sep. 10, 2020, and entitled "FUEL PUMP DEVICES, SYSTEMS, AND METHODS," the complete disclosures of which are expressly incorporated by reference herein.

FIELD OF THE DISCLOSURE

The present disclosure generally relates to fuel pumps and, in particular, to fuel pumps used in connection with internal combustion engines.

BACKGROUND

Internal combustion engines having common-rail fuel delivery systems use high-pressure fuel pumps to ensure adequate fuel pressure inside the rail at low engine speeds and to provide good air and fuel mixture at high engine speeds. To meter and pressurize fuel, a high-pressure fuel pump typically has a single-piece pumping plunger reciprocating within a bore of a barrel in the high-pressure fuel pump's body. High-pressure fuel pumps typically receive fuel from a low-pressure fuel pump, which draws fuel from a fuel storage, such as a fuel tank.

SUMMARY

The present disclosure generally relates to devices, systems, and methods involving an improved high-pressure fuel pumping apparatus for an internal combustion engine exhibiting increased reliability during a range of engine operating temperatures. According to principles of the present disclosure, designs and features for a high-pressure fuel pump housing are disclosed. Such designs and features can increase robustness of the high-pressure fuel pump in response to thermal effects by having an embossment over a press zone (e.g., a zone of increased bearing forces and thermal stresses) of the high-pressure fuel pump.

Principles of the present disclosure are advantageous, especially when used in connection with internal combustion engines. An advantage of the present disclosure is that, through the range of engine temperature operating conditions, the design of the high-pressure fuel pump can mitigate thermal stresses that result in geometrical deformations. Other advantages include reduced distortion due to thermal effects, increased elastic resistance, and the ability to accommodate large hoop stresses. As well, reduced geometrical deformations provided by the present disclosure result in increased structural margin for press fit assemblies (such as those that include a camshaft press fit into a body of the high-pressure fuel pump via a bushing), and ability to maintain desirable clearances (e.g., between the camshaft and the bushing). Other advantages not discussed in detail herein will be apparent to those skilled in the art.

According to embodiments of the present disclosure, a high-pressure fuel pump can be configured to couple to a low-pressure fuel pump. The high-pressure fuel pump can include a body and an embossment. The body can have a forward end and a rearward end opposite the forward end. The rearward end can be configured to couple to the low-pressure fuel pump. The embossment can include at least one fastener boss configured to receive a fastener to couple the low-pressure fuel pump to the high-pressure fuel pump. The embossment can be formed at the rearward end of the body such that thermal stresses that cause geometrical deformations at the embossment are reduced through a range of engine temperature operating conditions.

In some such examples, the embossment can be formed over a press zone of the body where a press-fit assembly is press fit with an internal surface of the embossment. In examples, a diameter of the embossment is four times a length thereof. In examples, the embossment can have a generally toroidal shape. In examples, an outer circumferential wall of the embossment can be transitioned into a generally flat portion at an upper portion of the embossment. In examples, the embossment can include at least one cutout that forms a portion of the at least one fastener boss. In examples, the at least one cutout can extend from an outer circumferential wall of the embossment to a sidewall of the embossment.

In some such examples, an outer surface portion of the at least one fastener boss can generally follow a profile of an outer circumferential wall of the embossment. In examples, the at least one fastener boss can be positioned at a lower portion of the embossment so as to circumvent a connector positioned at the lower portion of the embossment. In some such examples, the connector comprises a connector portion configured to couple a bracket to the embossment.

Examples of the present disclosure include a high-pressure fuel pump assembly that can include a body, a camshaft, and an embossment. The body can have a forward end and a rearward end opposite the forward end. The rearward end can be configured to couple to a low-pressure fuel pump. The camshaft can be received and secured within a central bore of the body so as to be rotationally movable within the central bore. A coupler end of the camshaft can be configured to couple to a drive shaft of the low-pressure fuel pump. In examples, the coupler end of the camshaft can be received within the press-fit assembly. In examples, the press-fit assembly can include a sleeve positioned about an exterior surface of a bushing configured to receive a coupler end of the camshaft. The embossment can include at least one fastener boss configured to receive a fastener to couple the low-pressure fuel pump to the high-pressure fuel pump assembly.

In some such examples, the embossment can be formed at the rearward end of the body such that thermal stresses that cause geometrical deformations at the embossment are reduced through a range of engine temperature operating conditions. In examples, the embossment can be formed over a press zone of the body where a press-fit assembly is press fit with an internal surface of the embossment. In examples, a diameter of the embossment is four times a length thereof.

Examples of the present disclosure include a housing for a high-pressure fuel pump configured to couple to a low-pressure fuel pump. The housing can include a body and an embossment. The body can have a forward end, a rearward end opposite the forward end, a central bore, and at least one cylinder that extends from the central bore. The rearward end can be configured to couple to the low-pressure fuel pump. The central bore can be configured to receive and secure a camshaft such that the camshaft is rotationally movable within the central bore and operative to cyclically actuate a plunger disposed within the at least one cylinder. The embossment can be a generally toroidal shape. The embossment can include at least one fastener boss configured to receive a fastener to couple the low-pressure fuel pump to the high-pressure fuel pump. The embossment can be formed at the rearward end of the body such that thermal stresses that cause geometrical deformations at the embossment are reduced through a range of engine temperature operating conditions.

In some such examples, the embossment can be formed over a press zone of the body where a press-fit assembly is press fit with an internal surface of the embossment. The press-fit assembly can include a sleeve positioned about an exterior surface of a bushing configured to receive a coupler end of the camshaft. The coupler end of the camshaft can be received within the press-fit assembly. In examples, the embossment can include at least one cutout that forms a portion of the at least one fastener boss. An at least one cutout can extend from an outer circumferential wall of the embossment to a sidewall of the embossment. An outer surface portion of the at least one fastener boss can generally follow a profile of the outer circumferential wall of the embossment and is positioned at a lower portion of the embossment so as to circumvent a connector positioned at the lower portion of the embossment.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1A:
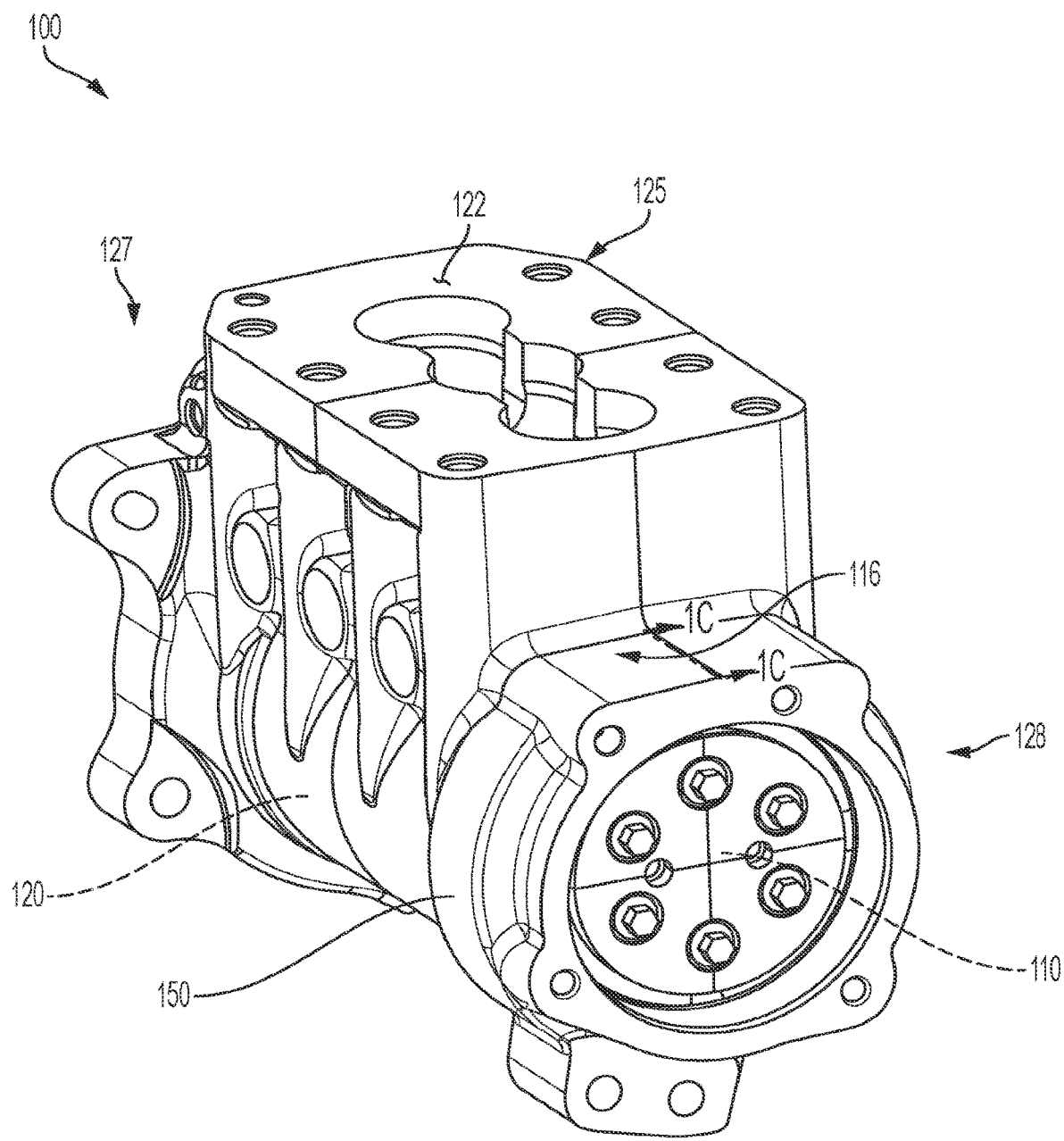
FIG. 1A is a perspective view of a high-pressure fuel pump assembly, in accordance with aspects of the present disclosure.

Although the drawings represent embodiments of the various features and components according to the present disclosure, the drawings are not necessarily to scale and certain features can be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Figure 1B:
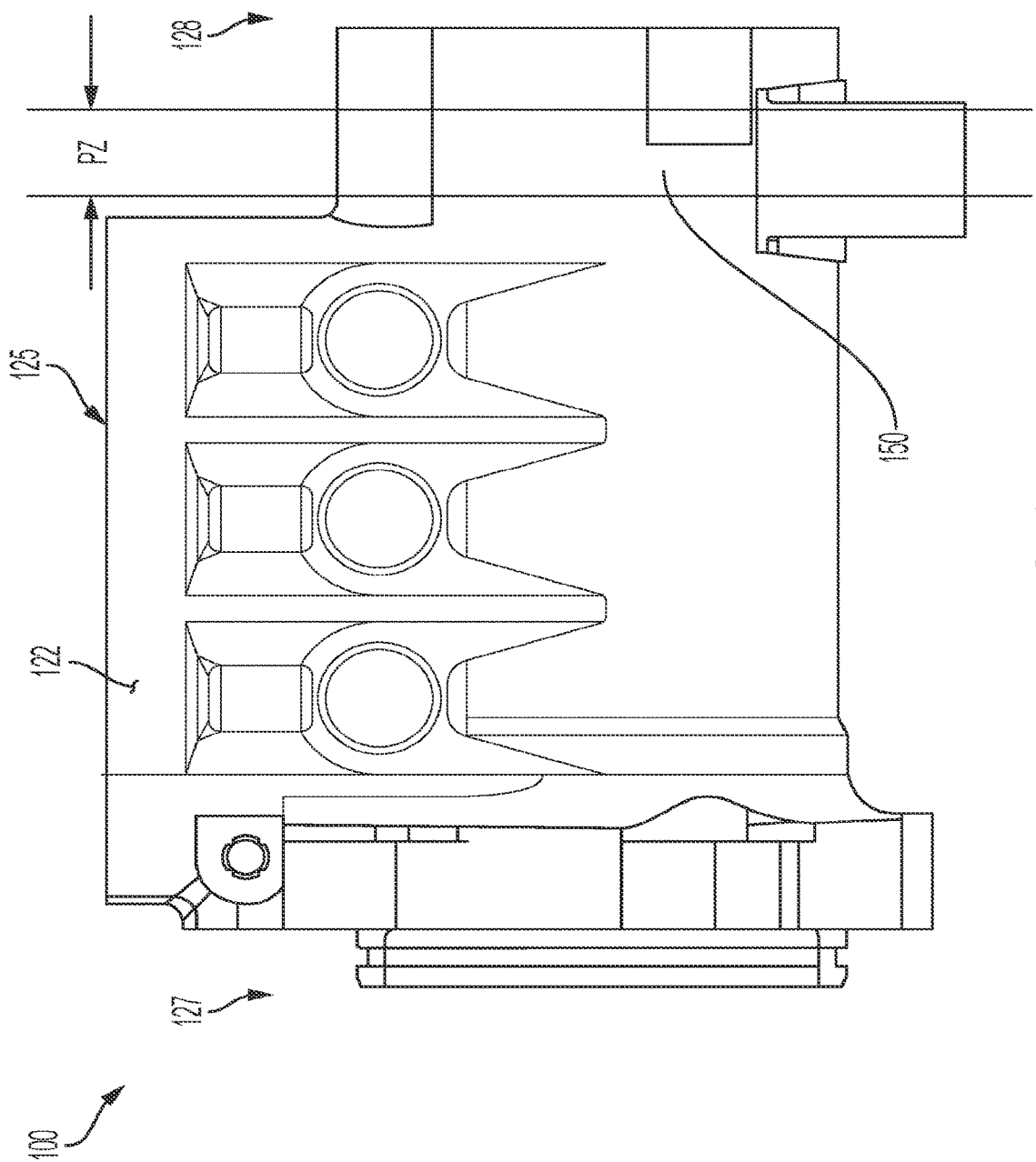
FIG. 1B is a side elevation view of a housing of a high-pressure fuel pump assembly, in accordance with aspects of the present disclosure.
Figure 1C:
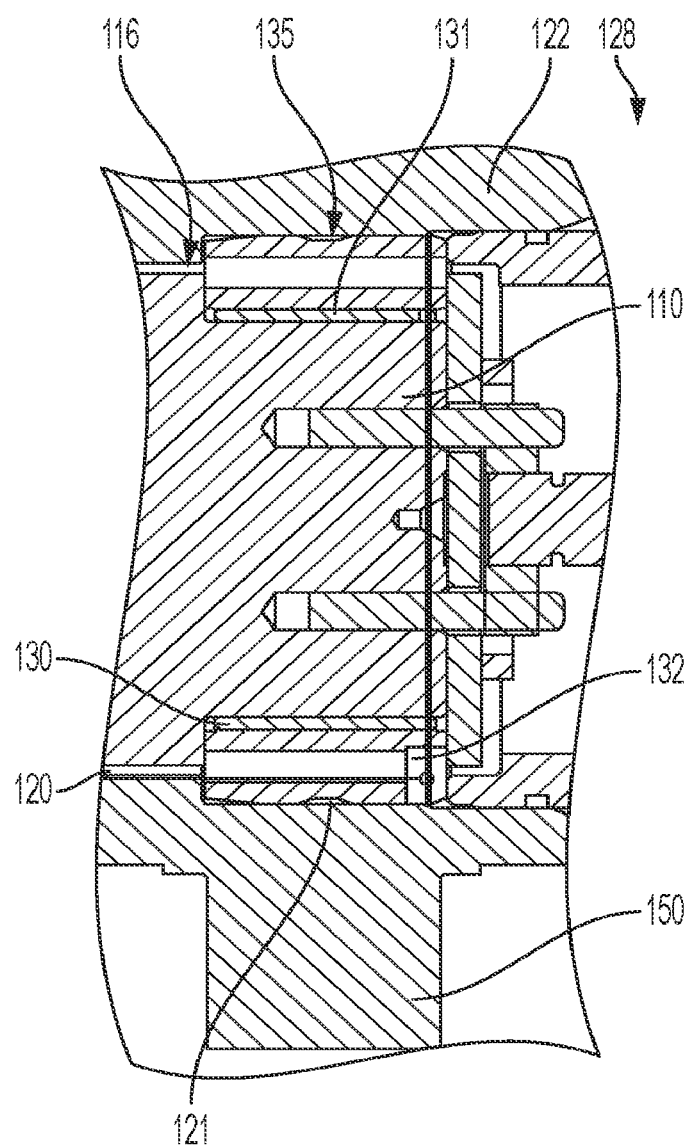
FIG. 1C is a cross-sectional view taken at section A-A of FIG. 1A, in accordance with aspects of the present disclosure.

Referring now to the figures, FIGS. 1A-1C show various views of a high-pressure fuel pump assembly 100, in accordance with aspects of the present disclosure. FIG. 1A shows a perspective view of a high-pressure fuel pump assembly 100, in accordance with aspects of the present disclosure. FIG. 1B shows a side elevation view of a housing 125 of the high-pressure fuel pump assembly 100, in accordance with aspects of the present disclosure. FIG. 1C shows a cross-sectional view taken at section A-A of FIG. 1A, in accordance with aspects of the present disclosure. Features of the examples shown in these figures will be discussed in detail below.

Cam-driven, high-pressure fuel pump assemblies have become a common solution for generating high pressure fuel in common rails used in direct injection internal combustion engines. A camshaft 110 can be received and secured within a central bore 120 that extends through a body 122 of a housing 125 of the high-pressure fuel pump assembly 100 so as to be rotationally movable within the central bore 120. The camshaft 110 includes cams 112, which convert rotational motion of the camshaft 110 into reciprocal motion (e.g., via an oblong shape of the cams 112). High-pressure fuel pump assemblies, such as the high-pressure fuel pump assembly 100, typically include pumping elements such as a plunger (not shown) reciprocating within cylinders 126 that extend from the central bore 120. Reciprocation of the plunger is typically accomplished using a cam follower connected to the plunger which follows a corresponding cam 112 as camshaft 110 rotates. Two bushings 130 in the high-pressure fuel pump assembly 100 can flank the camshaft 110 to support the camshaft 110 within the central bore 120. A bushing 130 is located at a forward end 127 of the high-pressure fuel pump assembly 100, and a bushing 130 within a sleeve 132 is located at a rearward end 128 of the high-pressure fuel pump assembly 100. A coupler end 116 of the camshaft 110 can be configured to couple to a drive shaft of a low-pressure fuel pump (not shown) coupled to a rearward end 128 of the high-pressure fuel pump assembly 100. The low-pressure fuel pump can be driven by the camshaft 110 so as to supply the high-pressure fuel pump assembly 100 with fuel to be pressurized. Under these circumstances, operation and assembly of the high-pressure fuel pump assembly 100 can impart complex combined loading and thermal effects (e.g., over a range of engine operating temperatures), which can compromise operation and reliability of the high-pressure fuel pump assembly 100.

The present disclosure relates to high-pressure fuel pump assemblies for a common rail in an internal combustion engine. More particularly, disclosed herein are devices, assemblies, and methods to reduce bearing distortion and to increase bushing 130 and sleeve 132 retention in high-pressure fuel pump assemblies that are multi-cylinder and cam-driven. According to principles of the present disclosure, a first fuel pump assembly 100 (e.g., a high-pressure fuel pump assembly 100) can include a body 122, a camshaft 110, and an embossment 150. The body 122 can have a forward end 127 and a rearward end 128 opposite the forward end 127. As described in further detail herein, the camshaft 110 can be received and secured within a central bore 120 of the body 122 so as to be rotationally movable within the central bore 120. The rearward end 128 can be configured to couple to a second fuel pump assembly (e.g., a low-pressure fuel pump assembly) (not shown). A coupler end 116 of the camshaft 110 can be configured to couple to a drive shaft of the low-pressure fuel pump, e.g., at the rearward end 128. Factors such as combined loading from the attached low-pressure fuel pump and from components of the high-pressure fuel pump assembly 100 itself as well as changing temperatures across a range of engine operating conditions produce localized hotspots that pose a risk to the operation and durability of the high-pressure fuel pump.

In examples, the embossment 150 can be formed over a press zone ("PZ") of the body 122 where a press-fit assembly 135 is press fit into an internal surface 121 of the embossment 150 as shown in FIGS. 1B and 1C. The press zone, PZ, can be defined as a portion of the fuel pump that experiences increased forces (e.g., bearing forces) due to internal components (e.g., the press-fit assembly 135) that are press fit within a body 122 of the high-pressure fuel pump assembly 100. Forces experienced at the press zone, PZ, can be exacerbated by components coupled to the high-pressure fuel pump assembly 100, such as a low-pressure fuel pump, as well as by harmonics, loads, and a range of operating temperatures experienced by the high-pressure fuel pump assembly 100 and coupled components during engine operation. Specific to the range of operating temperatures (e.g., up to about 220 degrees Fahrenheit), geometrical deformations can result from increasing temperatures, causing thermal stresses at the areas of geometrical deformation (e.g., at the press zone, PZ).

Bushings 130 and sleeves 132 can be included in the press-fit assembly 135 and can engage other components of the high-pressure fuel pump assembly 100. In examples, the press-fit assembly 135 can include a sleeve 132 positioned about an exterior surface 131 of a bushing 130 configured to receive a coupler end 116 of the camshaft 110. The coupler end 116 of the camshaft 110 can be received within the press-fit assembly 135, for example, within the bushing 130. In this manner, the press-fit assembly 135 can be a three-shell type press-fit assembly 135 comprising portions of the body 122 acting as an outer cylinder, the sleeve 132 acting as a middle cylinder, and the bushing 130 acting as the inner cylinder. The press-fit assembly 135 can be a rear section of the high-pressure fuel pump assembly 100, e.g., at the press zone, PZ. For this section of the high-pressure fuel pump assembly 100, the embossment 150 can mitigate the thermal stresses that will equalize the geometrical deformations through the range of engine temperature operating conditions.

Figure 2B:
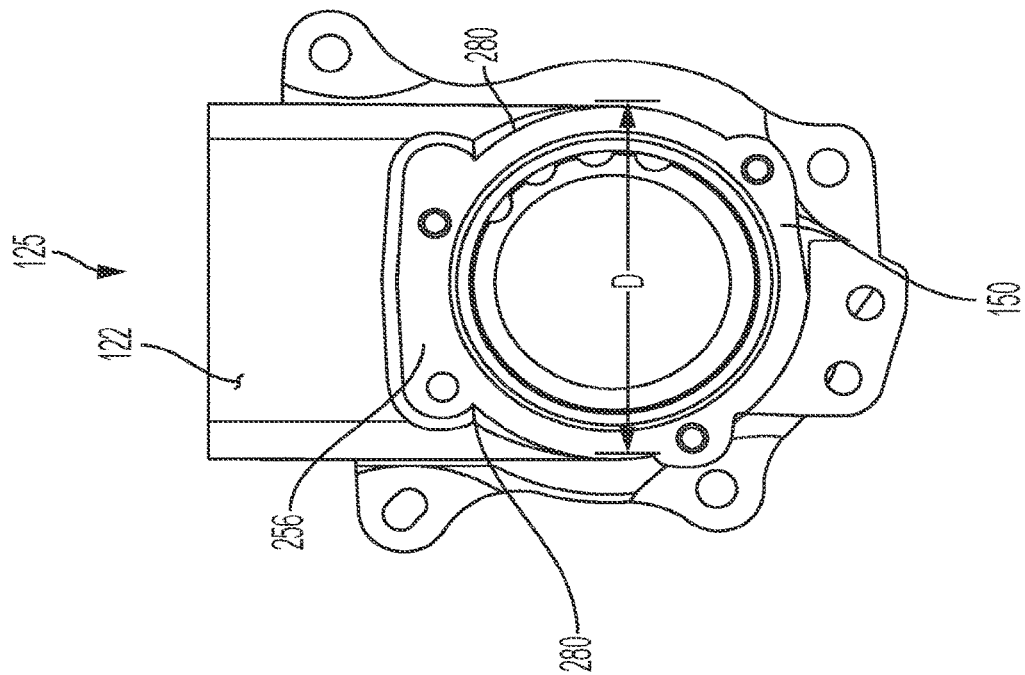
FIG. 2B is a rear elevation view of a housing of a high-pressure fuel pump, in accordance with aspects of the present disclosure.
Figure 2A:
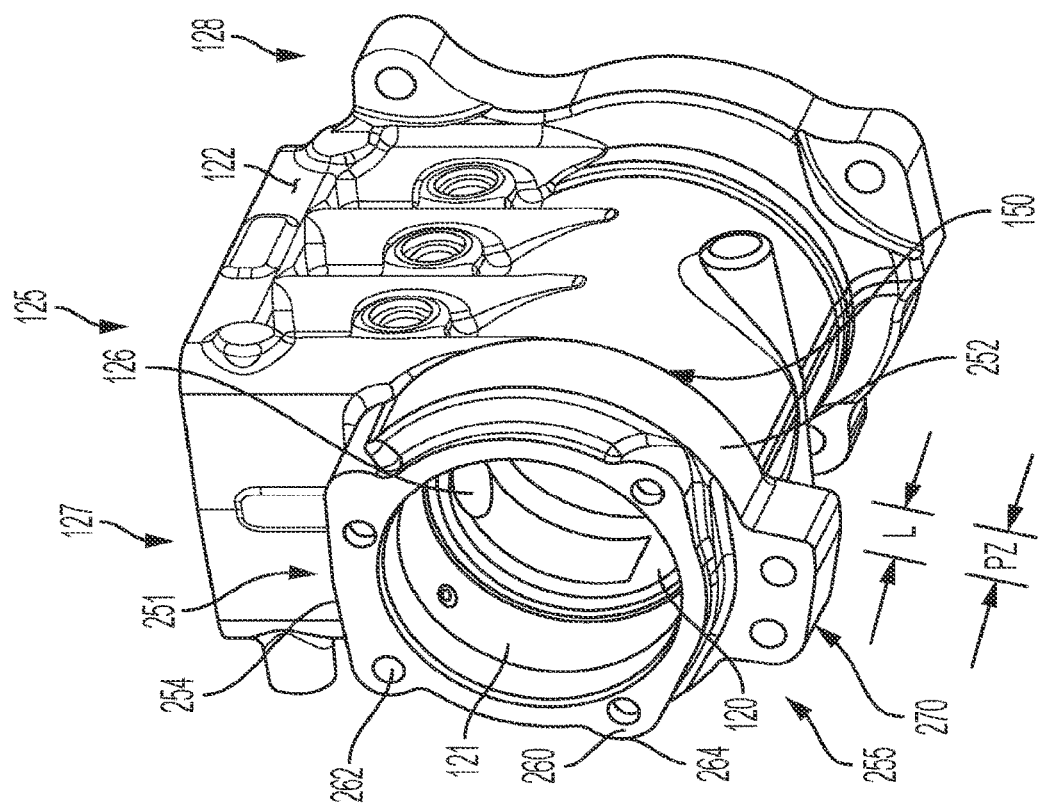
FIG. 2A is a perspective view of a housing of a high-pressure fuel pump, in accordance with aspects of the present disclosure.

FIGS. 2A and 2B show various views of a housing 125 of a high-pressure fuel pump. FIG. 2A shows a perspective view of a housing 125 of a high-pressure fuel pump, in accordance with aspects of the present disclosure. FIG. 2B shows a rear elevation view of a housing 125 of a high-pressure fuel pump, in accordance with aspects of the present disclosure. Such high-pressure fuel pumps can be used in high-pressure fuel pump assemblies discussed elsewhere herein. Features of the examples shown in these figures will be discussed below.

Examples shown in these figures can be similar to those described elsewhere herein. For example, a housing 125 for a high-pressure fuel pump can be configured to couple to a low-pressure fuel pump and can include a body 122 and an embossment 150. The body 122 can have a forward end 127, a rearward end 128 opposite the forward end 127, a central bore 120, and at least one cylinder 126 that extends from the central bore 120. In examples, the embossment 150 can be formed over a press zone, PZ, of the body 122 where a press-fit assembly is press fit with an internal surface 121 of the embossment 150. The rearward end 128 can be configured to couple to the low-pressure fuel pump. The central bore 120 can be configured to receive and secure a camshaft such that the camshaft is rotationally movable within the central bore 120 and operative to cyclically actuate a plunger disposed within the at least one cylinder 126. The press-fit assembly can optionally include a sleeve positioned about an exterior surface of a bushing configured to receive a coupler end of the camshaft. The coupler end of the camshaft can be received within the press-fit assembly. When assembled, the press-fit assembly can bear against an inner surface of the housing 125 within the press zone, PZ, (e.g., the internal surface 121 of the embossment 150).

Surrounding the press zone, PZ, in some examples, the embossment 150 can provide improved structural margin and elastic resistance to accommodate large hoop stresses thereat and reduce distortion due to thermal effects. The embossment 150 can be formed at the rearward end 128 of the body 122 such that thermal stresses that cause geometrical deformations at the embossment 150 are reduced through a range of engine temperature operating conditions. For example, the embossment 150 can have a generally toroidal (e.g., ring or donut) shape and can be profiled over a portion of the housing 125 (e.g., at the rearward end 128). In this manner, the embossment 150 can be defined by a diameter, D, and a length, L. In examples, a diameter, D, of the embossment 150 is greater than the length, L, thereof. For example, the diameter, D, can be two, three, four, or five times and so on the length, L, of the embossment 150. In examples, the length, L, can be the length of the press zone, PZ.

Design of the embossment 150 can be a balance of dimensions and surface features to achieve engineering design criteria while controlling geometric deformations that will maintain clearances between components in the high-pressure fuel pump. As noted above, the diameter, D, and the length, L, of the embossment 150 can be prescribed. Additionally, or alternatively, the embossment 150 can include at least one fastener boss 260 configured to receive a fastener (not shown) to couple the low-pressure fuel pump to the high-pressure fuel pump (e.g., at the housing 125). In examples, an outer circumferential wall 252 of the embossment 150 can be entirely circular. In other examples, as shown here, the outer circumferential wall 252 can be partially circular. In some such examples, an outer circumferential wall 252 of the embossment 150 can be transitioned into a generally flat portion 254 at an upper portion 251 of the embossment 150.

Fastener bosses 260 positioned about the embossment 150 can facilitate coupling components, such as the low-pressure fuel pump, to the high-pressure fuel pump. The flat portion 254 of the embossment 150 can include one or more fastener holes 262 positioned within one or more fastener bosses 260 as can other portions of the embossment 150. The embossment 150 can include at least one fastener boss 260 configured to receive a fastener to couple the low-pressure fuel pump to the high-pressure fuel pump. The fastener bosses 260 can include fastener holes 262 configured to receive fasteners or inserts for coupling components (such as a low-pressure fuel pump) to the high-pressure fuel pump. The number of fastener bosses 260 can correspond to or be different from the number of fastener holes 262. In examples, an outer surface portion 264 of the at least one fastener boss 260 can generally follow a profile of an outer circumferential wall 252 of the embossment 150 and can be positioned at a lower portion 255 of the embossment 150 so as to circumvent a connector 270 positioned at the lower portion 255 of the embossment 150.

Cutouts 280 can be arranged about the embossment 150 and can form embossment features such as the fastener bosses 260. In examples, the embossment 150 can include at least one cutout 280 that forms a portion of the at least one fastener boss 260. The at least one cutout 280 can extend from the outer circumferential wall 252 of the embossment 150, for example, to a sidewall 256 of the embossment 150. In this manner, the cutouts 280 can be in the form of a bevel at a circumferential edge of the embossment 150. In other examples, the cutouts 280 can be in the form of a recess from the sidewall 256 into the embossment 150. In examples, the embossment 150 can include at least one cutout 280 that forms a portion of the at least one fastener boss 260. In this manner, an outer surface portion 264 of the fastener boss can be formed by a cutout. The outer surface portion 264 of the at least one fastener boss 260 can generally follow a profile of the outer circumferential wall 252 of the embossment 150. In this manner, the outer surface portion 264 of the at least one fastener boss 260 can be positioned at a lower portion 255 of the embossment 150 so as to circumvent a connector What 270 positioned at the lower portion 255 of the embossment 150. The connector 270 may be used to couple components to the high-pressure fuel pump.

Figure 3B:
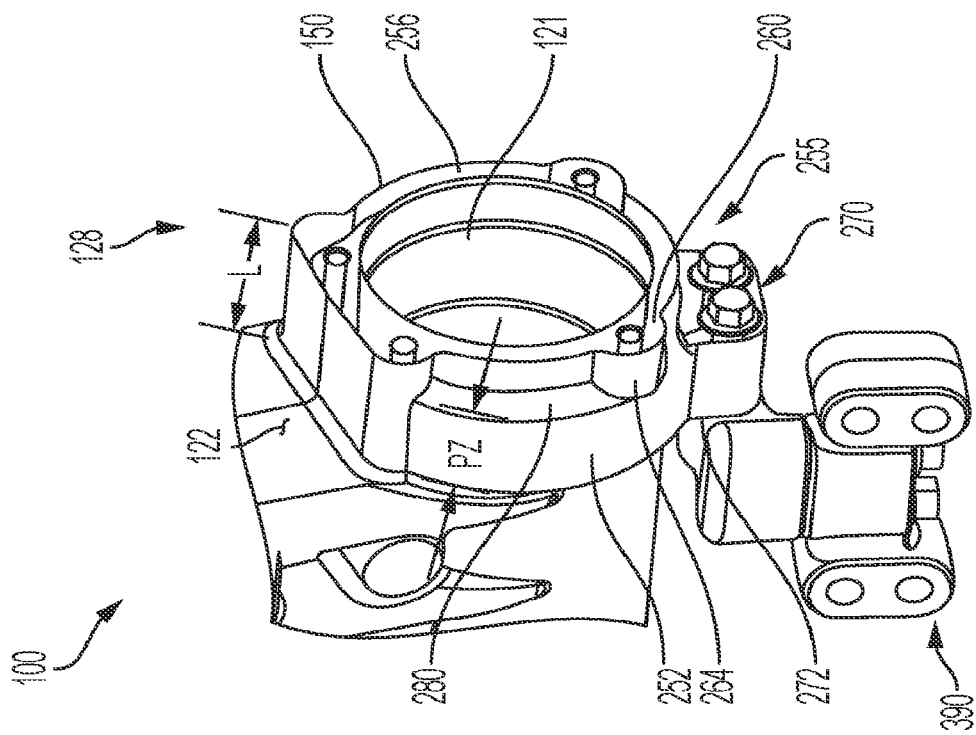
FIG. 3B is a perspective view of a rearward end of a high-pressure fuel pump assembly, in accordance with aspects of the present disclosure.
Figure 3A:
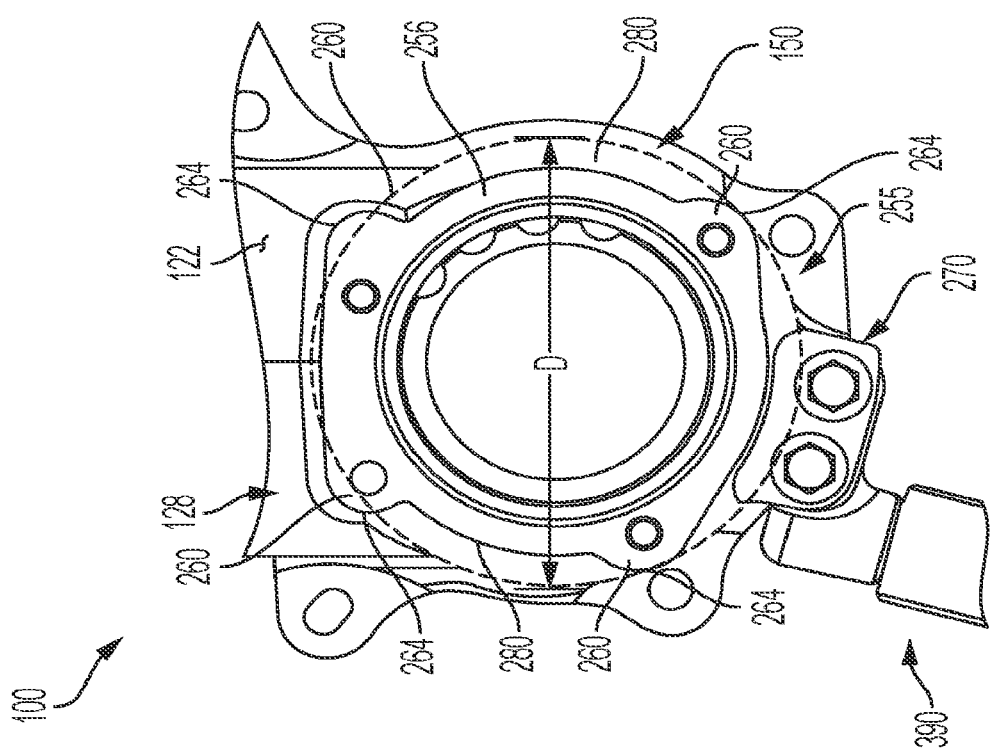
FIG. 3A is a rear elevational view of a high-pressure fuel pump assembly, in accordance with aspects of the present disclosure.

FIGS. 3A and 3B show various views of a high-pressure fuel pump assembly 100 having a bracket 390. FIG. 3A shows a side elevational view of a high-pressure fuel pump assembly 100, in accordance with aspects of the present disclosure. FIG. 3B shows perspective view of rearward end 128 of a high-pressure fuel pump assembly 100, in accordance with aspects of the present disclosure. Features of the examples shown in these figures will be discussed below.

Examples shown in these figures are similar to those described elsewhere herein. For example, the high-pressure fuel pump assembly 100 can be configured to couple to a low-pressure fuel pump and can include a body 122 and an embossment 150. The body 122 can have a forward end 127 and a rearward end 128 opposite the forward end and optionally can be configured to couple to the low-pressure fuel pump. The embossment 150 can include at least one fastener boss 260 configured to receive a fastener to couple the low-pressure fuel pump to the high-pressure fuel pump assembly 100. The embossment 150 can be formed at the rearward end 128 of the body 122 such that thermal stresses that cause geometrical deformations at the embossment 150 are reduced through a range of engine temperature operating conditions. The embossment 150 can optionally have a generally toroidal shape and can optionally be formed over a press zone, PZ, of the body 122 where a press-fit assembly is press fit with an internal surface 121 of the embossment 150. A diameter, D, of the embossment 150 can be greater than (e.g., about two, three, four, or five) times a length, L, thereof. In examples, an outer surface portion 264 of the at least one fastener boss 260 can generally follow a profile of an outer circumferential wall 252 of the embossment 150. In examples, the embossment 150 can include at least one cutout 280 that forms a portion of the at least one fastener boss 260. In examples, the at least one cutout 280 can extend from an outer circumferential wall 252 of the embossment 150 to a sidewall 256 of the embossment 150.

Other components besides or in addition to the low-pressure fuel pump, such as a bracket 390, can be coupled to the high-pressure fuel pump assembly 100. In examples, the at least one fastener boss 260 can be positioned at a lower portion 255 of the embossment 150 so as to circumvent a connector 270 positioned at the lower portion 255 of the embossment 150. In some such examples, the connector 270 comprises a connector portion 272 configured to couple a bracket 390 to the embossment 150. Under these circumstances, the connector portion 272 can be in the form of a protrusion from the embossment 150 and can include one or more fastener holes configured to receive fasteners for coupling the bracket 390 to the connector portion 272.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an embodiment, B alone can be present in an embodiment, C alone can be present in an embodiment, or that any combination of the elements A, B or C can be present in a single embodiment; for example, A and B, A and C, B and C, or A and B and C.

In the detailed description herein, references to "one embodiment," "an embodiment," "an example embodiment," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus While the embodiments have been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

What is claimed is:

1. A high-pressure fuel pump configured to couple to a low-pressure fuel pump, the high-pressure fuel pump comprising:
a body that has a forward end and a rearward end opposite the forward end, the rearward end protruding from the body including a press zone and configured to couple to the low-pressure fuel pump; and
an embossment formed over the press zone that includes at least one fastener boss configured to receive a fastener to couple the low-pressure fuel pump to the high-pressure fuel pump and that is formed at the rearward end of the body such that thermal stresses that cause geometrical deformations at the embossment are reduced through a range of engine temperature operating conditions.

2. The high-pressure fuel pump of claim 1, wherein the embossment is formed over the press zone of the body where a press-fit assembly is press fit into an internal surface of the embossment.

3. The high-pressure fuel pump of claim 1, wherein a diameter of the embossment is about four times a length thereof.

4. The high-pressure fuel pump of claim 1, wherein an outer surface portion of the at least one fastener boss generally follows a profile of an outer circumferential wall of the embossment.

5. The high-pressure fuel pump of claim 1, wherein the at least one fastener boss is positioned at a lower portion of the embossment so as to circumvent a connector positioned at the lower portion of the embossment.

6. The high-pressure fuel pump of claim 5, wherein the connector comprises a connector portion configured to couple a bracket to the embossment.

7. The high-pressure fuel pump of claim 1, wherein the embossment includes at least one cutout that forms a portion of the at least one fastener boss.

8. The high-pressure fuel pump of claim 7, wherein the at least one cutout extends from an outer circumferential wall of the embossment to a sidewall of the embossment.

9. The high-pressure fuel pump of claim 1, wherein the embossment has a generally toroidal shape.

10. The high-pressure fuel pump of claim 1, wherein an outer circumferential wall of the embossment is transitioned into a generally flat portion at an upper portion of the embossment.

11. A high-pressure fuel pump assembly comprising:
a body that has a forward end and a rearward end opposite the forward end, the rearward end protruding from the body including a press zone and configured to couple to a low-pressure fuel pump;
a camshaft received and secured within a central bore of the body so as to be rotationally movable within the central bore, a coupler end of the camshaft configured to couple to a drive shaft of the low-pressure fuel pump; and
an embossment formed over the press zone that includes at least one fastener boss configured to receive a fastener to couple the low-pressure fuel pump to the high-pressure fuel pump assembly and that is formed at the rearward end of the body such that thermal stresses that cause geometrical deformations at the embossment are reduced through a range of engine temperature operating conditions.

12. The high-pressure fuel pump assembly of claim 11, wherein the embossment is formed over the press zone of the body where a press-fit assembly is press fit into an internal surface of the embossment.

13. The high-pressure fuel pump assembly of claim 12, wherein the coupler end of the camshaft is received within the press-fit assembly.

14. The high-pressure fuel pump assembly of claim 12, wherein the press-fit assembly includes a sleeve positioned about an exterior surface of a bushing configured to receive a coupler end of the camshaft.

15. The high-pressure fuel pump of claim 1, wherein a diameter of the embossment is about four times a length thereof.

16. The high-pressure fuel pump of claim 1, wherein an outer surface portion of the at least one fastener boss generally follows a profile of an outer circumferential wall of the embossment and is positioned at a lower portion of the embossment so as to circumvent a connector positioned at the lower portion of the embossment.

17. The high-pressure fuel pump of claim 1, wherein the embossment includes at least one cutout that forms a portion of the at least one fastener boss, and wherein the at least one cutout extends from an outer circumferential wall of the embossment to a sidewall of the embossment.

18. A housing for a high-pressure fuel pump configured to couple to a low-pressure fuel pump, the housing comprising:
a body that has a forward end, a rearward end opposite the forward end, a central bore, and at least one cylinder that extends from the central bore, the rearward end protruding from the body including a press zone and configured to couple to the low-pressure fuel pump, the central bore configured to receive and secure a camshaft such that the camshaft is rotationally movable within the central bore and operative to cyclically actuate a plunger disposed within the at least one cylinder; and
an embossment formed over the press zone that is a generally toroidal shape, includes at least one fastener boss configured to receive a fastener to couple the low-pressure fuel pump to the high-pressure fuel pump, and is formed at the rearward end of the body such that thermal stresses that cause geometrical deformations at the embossment are reduced through a range of engine temperature operating conditions.

19. The housing of claim 18, wherein the embossment is formed over the press zone of the body where a press-fit assembly is press fit into an internal surface of the embossment, wherein the press-fit assembly includes a sleeve positioned about an exterior surface of a bushing configured to receive a coupler end of the camshaft, and wherein a coupler end of the camshaft is received within the press-fit assembly.

20. The housing of claim 18, wherein the embossment includes at least one cutout that forms a portion of the at least one fastener boss, wherein the at least one cutout extends from an outer circumferential wall of the embossment to a sidewall of the embossment, and wherein an outer surface portion of the at least one fastener boss generally follows a profile of the outer circumferential wall of the embossment and is positioned at a lower portion of the embossment so as to circumvent a connector positioned at the lower portion of the embossment.

* * * * *